United States Patent [19]

Robinson, Jr. et al.

[11] Patent Number: 5,255,338
[45] Date of Patent: Oct. 19, 1993

[54] HEAT PUMP WATER HEATER CONTROL CIRCUIT

[75] Inventors: Glen P. Robinson, Jr., Atlanta; Andrew L. Blackshaw, Dunwoody, both of Ga.

[73] Assignee: Electric Power Research Institute, Inc., Palo Alto, Calif.

[21] Appl. No.: 729,418

[22] Filed: Jul. 12, 1991

[51] Int. Cl.$^5$ ............ H05B 3/78; F24H 1/20
[52] U.S. Cl. ................. 392/451; 392/454; 219/510; 165/29
[58] Field of Search ............ 392/451–454, 392/463, 464; 219/510, 494; 165/29; 62/238.6, 238.7; 126/374, 362; 237/2 B

[56] References Cited

U.S. PATENT DOCUMENTS

| | | |
|---|---|---|
| 2,157,910 | 5/1939 | McCormick .......... 392/463 |
| 3,241,603 | 3/1966 | Nagata .................. 165/29 |
| 4,540,874 | 9/1985 | Shaffer, Jr. et al. ..... 62/238.6 |
| 4,543,468 | 9/1985 | Shaffer, Jr. et al. ..... 62/238.6 |
| 4,740,673 | 4/1988 | Robinson, Jr. .......... 219/510 |

FOREIGN PATENT DOCUMENTS 8808658 11/1988 World Int. Prop. O. .......... 392/454

Primary Examiner—Bruce A. Reynolds
Assistant Examiner—John A. Jeffery
Attorney, Agent, or Firm—B. J. Powell

[57] ABSTRACT

An external circuit that works in conjunction with the existing tank thermostatic controls to control both a water heating heat pump and the existing resistance elements in a water heater. The existing resistance elements are disabled to allow the heat pump to heat the water unless a large volume of hot water is quickly withdrawn whereupon the resistance elements are re-enabled to heat the water for a faster recovery rate.

17 Claims, 3 Drawing Sheets

HEAT PUMP WATER HEATER CONTROL CIRCUIT

BACKGROUND OF THE INVENTION

Because of the better coefficient of performance of heat pumps as compared to electrical resistive heating elements, there has been a movement in recent years to purchase electric resistance hot water heaters and then connect the water heater tank to a heat pump so that the heating was actually performed by the heat pump rather than the electric resistance elements in the water heater itself. This produced a good coefficient of performance while at the same time retained the electric resistance heating elements as a standby. One such arrangement is illustrated in U.S. Pat. No. 4,740,673, issued May 26, 1988, entitled "Dual Control Thermostat Circuit" that allows the conventional upper and lower thermostats to control the operation of the external heat pump.

One of the problems associated with heat pump heaters for water heaters is that the heating rate of the heat pump is typically slower than the heating rate associated with the resistance heating elements that come in the water heater. As a result, the heat recovery rate was less than desirable when there was a large drain of hot water from the tank and the upper section of the tank started to cool.

SUMMARY OF THE INVENTION

These and other problems and disadvantages associated with the prior art are overcome by the invention disclosed herein by providing an external circuit that works in conjunction with the existing tank thermostatic controls to control both the heat pump and the existing resistance elements by allowing the water heater to switch to the resistance heating mode automatically when there is a large drain of hot water and the upper section of the tank begins to cool. The heat pump and resistance modes may operate nonsimultaneously or simultaneously as desired.

The heat pump water heater control circuit of the invention includes an impedance and a thermostatically operated bypass switch in parallel with each other connecting the existing tank circuit to line voltage through the existing thermostatic switch in the water heater. The impedance has a sufficiently high impedance to reduce the current flow through the resistive heating elements to the level that substantially prevents the heating capability of the electric resistive heating elements when the existing thermostatic switch network in the hot water tank normally associated with the electrical resistive heating elements closes. The impedance controls an operative element to connect the heat pump circuitry to line voltage to operate the heat pump when line voltage is imposed across the impedance. The bypass switch closes when a sufficiently large volume of hot water is withdrawn from the water tank to cause the temperature in the upper portion of the water tank to drop. This re-enables the existing upper resistive heating element and disables the impedance until the temperature in the upper portion of the tank is raised back to the desired temperature. In those instances where both the heat pump and resistance element can be simultaneously operated, a latching relay is used to keep the heat pump working when the bypass switch closes.

These and other features and advantages of the invention will become more clearly understood upon consideration of the following detailed description and accompanying drawings wherein like characters of reference designate corresponding parts throughout the several views and in which:

These figures and the following detailed description disclose specific embodiments of the invention, however, is to be understood that the inventive concept is not limited thereto since it may be embodied in other forms.

DETAILED DESCRIPTION OF ILLUSTRATIVE EMBODIMENTS

Figure 1:
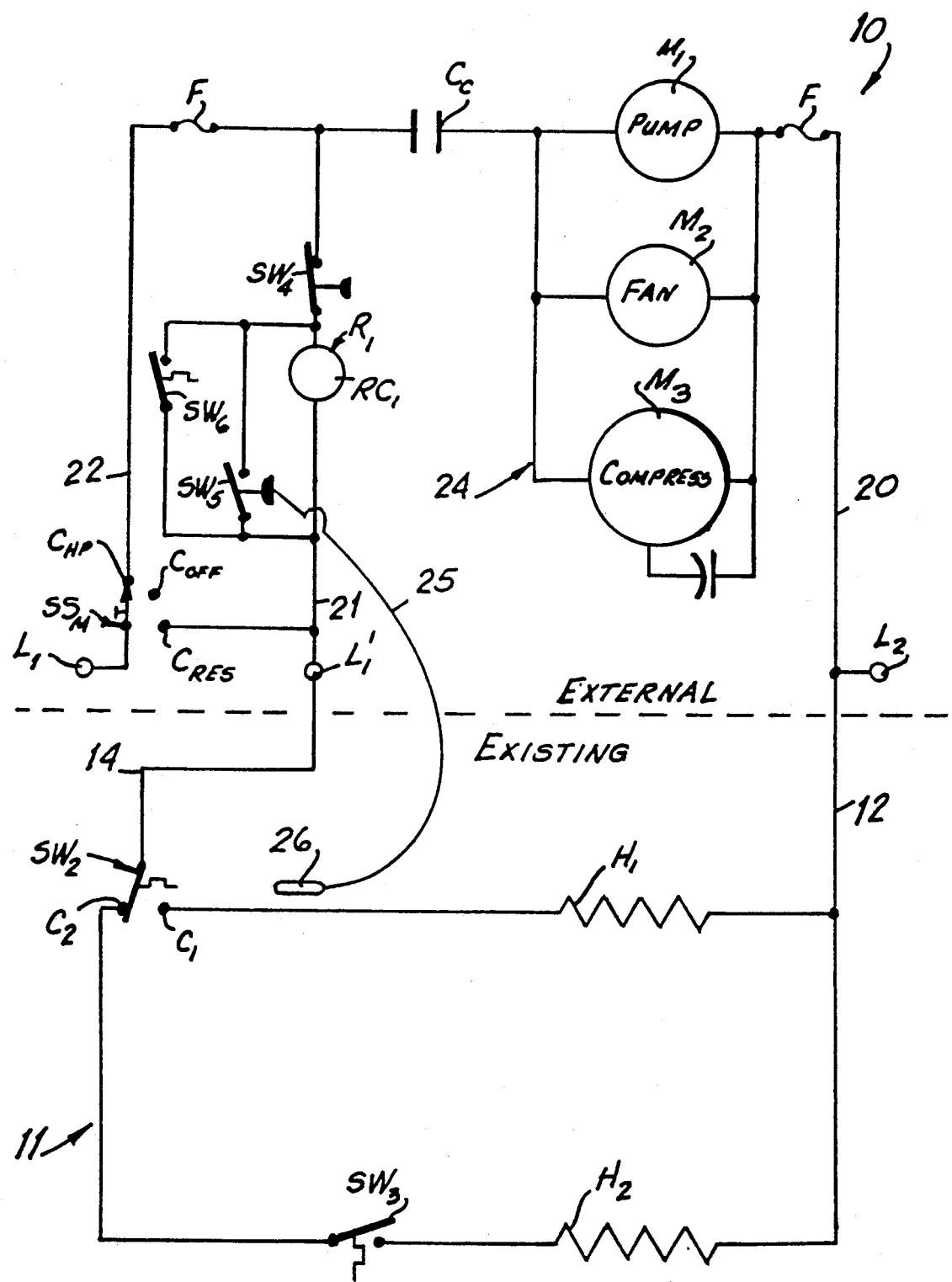
FIG. 1 is an electrical schematic illustrating the control circuit of the invention shown connected to a conventional dual element electric water heater.
Figure 2:
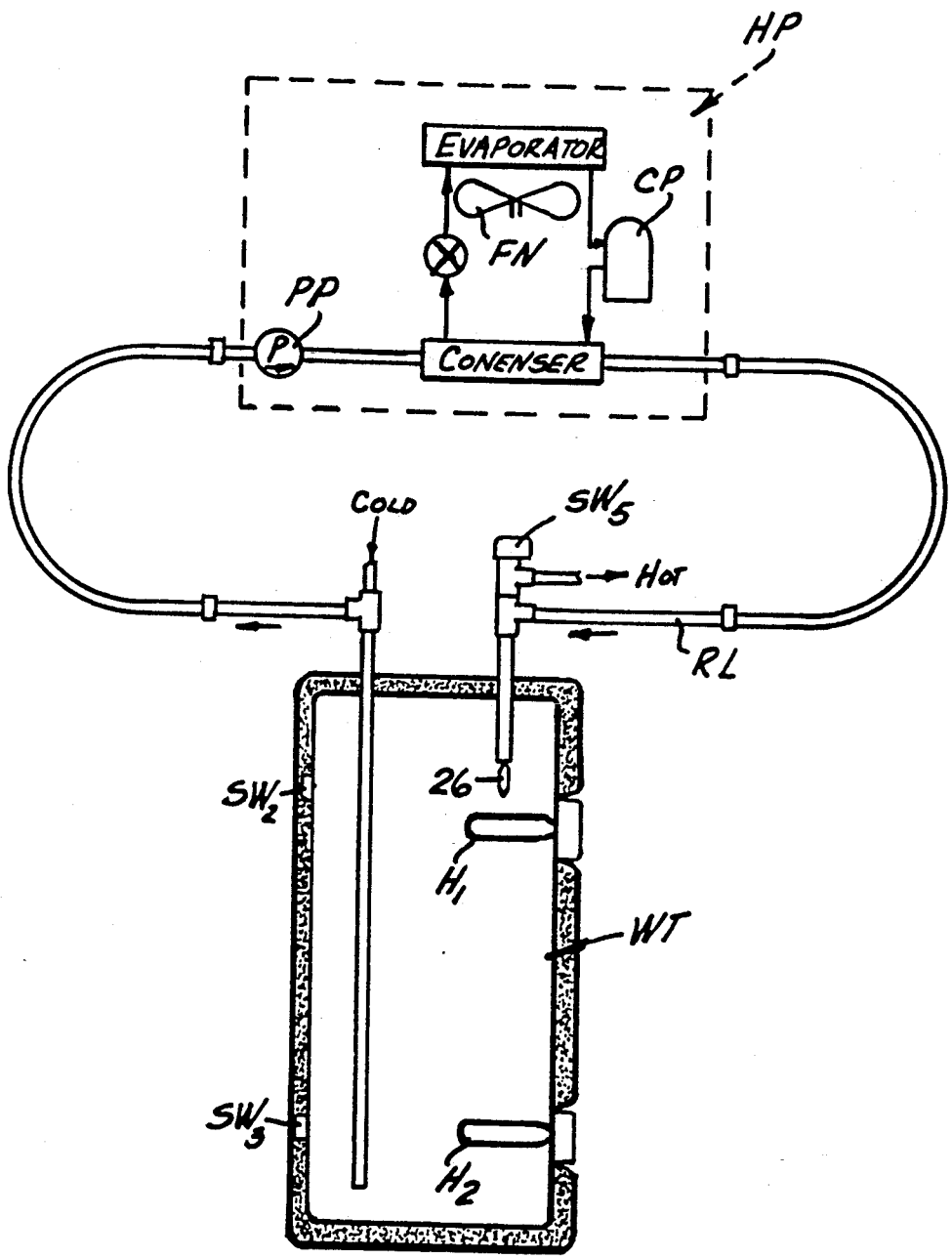
FIG. 2 is a diagrammatic view of a water heater with the invention installed; and, FIG. 3 is an electrical schematic illustrating a second embodiment of the invention.

Referring to FIG. 1, the heat pump water heater control circuit 10 is connected to an existing tank circuit 11. This allows the circuit 10 to be connected to the water heater WH (FIG. 2) without having to modify the existing tank circuit 11.

The existing tank circuit 11 includes a conductor 12 which is connected to a terminal $L_2$ adapted to be connected to one side of line voltage. Conductor 12 is connected to one end of both electrical resistance heating elements $H_1$ and $H_2$. The other side of the upper heating element $H_1$ is connected to contact $C_1$ of a single pole double throw (SPDT) thermostatically operated switch $SW_2$ located on the upper portion of the water tank. The other side of the lower heating element $H_2$ is connected to one side of thermostatically operated switch $SW_3$ located on the lower portion of the water tank which in turn is connected to the contact $C_2$ of SPDT switch $SW_2$. The common side $C_3$ of the switch $SW_2$ is connected to conductor 14 which in turn is connected to a terminal $L_1'$ adapted to be connected to the other side of line voltage in its originally intended usage. Typically, line voltage is 230 volts although different line voltages would work just as well.

The heat pump water heater control circuit 10 is designed to connect the existing tank circuit 11 to line voltage so that the circuit 10 effectively controls the water heating operation. The circuit 10 includes wire 20 which is connected to one side of line voltage, typically at terminal $L_2$. That side of the circuit 11 still remains connected to one side of line voltage at terminal $L_2$. Terminal $L_1'$ in existing circuit 11 is disconnected from line voltage and connected to the circuit 10 as will become more apparent.

The heat pump water heater control circuit 10 also includes wire 21 which is connected to conductor 14 at terminal $L_1$ in the existing tank circuit 11. Wire 21 is connected to one side of a high impedance relay coil $RC_1$ of relay $R_1$. The opposite side of the coil $RC_1$ is connected to one side of a high pressure cutout switch $SW_4$. Switch $SW_4$ is a safety switch which opens to disable the heat pump circuit when the refrigerant pressure becomes too high.

As explained in U.S. Pat. No. 4,740,673, the resistance of the relay coil $RC_1$ is selected so that the current flow therethrough required to operate the relay will be minimal when line voltage is imposed across it. In the particular example, the relay $R_1$ is selected with a 10 watt coil which allows a current flow of about 1/20 amp when 230 volts is imposed across it. Typically, the current flow through an existing tank circuit to cause the heating elements $H_1$ and $H_2$ to heat produces current flow in the neighborhood of 10-25 amps. Thus, when relay coil $RC_1$ is connected in series with either resistance elements $H_1$ and $H_2$, negligible heat is generated in the water but there will be sufficient current flow to operate relay $R_1$.

The other side of the switch $SW_4$ is connected to the heat pump contact $C_{HP}$ of a manually operated selector switch $SS_M$ through fuse F and wire 22. The common side of selector switch $SS_M$ is connected to line voltage at terminal $L_1$. The resistance heating contact $C_{RES}$ of switch $SS_M$ is connected directly to the original terminal $L_1'$ while the "off" contact $C_{OFF}$ is left unconnected. The selector switch $SS_M$ allows the user to manually select heat pump operation when contact $C_{HP}$ is closed, to select only electrical resistance heating when contact $C_{RES}$ is closed or to turn the water heater off when contact $C_{OFF}$ is closed.

When the contact $C_{HP}$ is closed, line voltage at terminal $L_1$ is supplied through fuse F and contacts $C_c$ of the relay $R_1$ to a heat pump circuit 24. The circuit 24 is connected to the other side of line voltage at terminal $L_2$ through fuse F and wire 20. The heat pump circuit 24 includes a water pump motor $M_1$, a fan motor $M_2$ and a compressor motor $M_3$ connected in parallel with each other between the wires 20 and 22 through the contacts $C_c$ of relay $R_1$.

To take advantage of the higher recovery rate of the resistance heating element $H_1$ when a large volume of hot water is withdrawn from the water tank, a thermostatically operated switch $SW_5$ is connected in parallel across the coil $RC_1$ so that closing switch $SW_5$ shorts out coil $RC_1$ to effectively disable relay $R_1$ and the heat pump while at the same time re-enabling the heating element $H_1$ as will become more apparent. The switch $SW_5$ is preferably a bulb type thermostat so that the capillary tube 25 and sensing bulb 26 thereof can be inserted into the water tank WT through the hot water return line RL from the heat pump HP as diagrammatically shown in FIG. 2. This permits the bulb 26 to be located at about the same height in the water tank WT as the upper thermostatic switch $SW_2$. An appropriate coating such as plastic is applied to the capillary tube 25 and the bulb 26 to protect them and isolate the operating fluid in the switch from the potable water. The set points of the thermostatic switches $SW_2$ and $SW_5$ are selected to be the same so that switch $SW_5$ closes when the contact $C_1$ of the switch $SW_2$ closes so that the upper heating element $H_1$ is energized at the same time the relay $R_1$ is disabled.

Because the heating capacity of the heat pump HP is undesirably reduced when the temperature of the ambient air from which the heat pump is extracting heat falls below a certain range, an ambient thermostatic bypass switch $SW_6$ is also connected in parallel across the coil $RC_1$ of the relay $R_1$. Thus, the heat pump circuit 24 is also disabled and the resistance heating elements $H_1$ and $H_2$ re-enabled when the switch $SW_6$ closes. Typically, the set point of the switch $SW_6$ is about 45° F.

When either thermostatic switch $SW_2$ or $SW_3$ closes to call for water heating, coil $RC_1$ of relay $R_1$ is energized to close contacts $C_c$ and energize the compressor CP, pump PP and fan FN. The small current through the coil $RC_1$ produces a negligible voltage drop through the particular heating element $H_1$ or $H_2$ connected in the circuit. Water is circulated through and heated by the heat pump HP until both tank thermostatic switches $SW_2$ and $SW_3$ are satisfied. The coil $RC_1$ is de-energized when the switches $SW_2$ and $SW_3$ are satisfied to turn off the heat pump circuit 24.

If a sufficiently large amount of hot water is withdrawn from the water tank to cause the contact $C_1$ of the upper thermostatic switch $SW_2$ to close and the switch $SW_5$ to close due to the drop of water temperature, the coil $RC_1$ of contactor relay $R_1$ is bypassed allowing full current to be supplied to the heating elements, normally to the upper element $H_1$ since thermostatic switch $SW_2$ will be closed when the upper section of the tank begins to cool. Thermostatic switches $SW_2$ and $SW_5$ should be set at approximately the same temperatures. When thermostatic switch $SW_5$ is satisfied and opens, the system reverts back to the heat pump mode until the lower thermostatic switch $SW_3$ is satisfied. This configuration does not allow simultaneous operation of the resistance and heat pump modes.

Figure 3:
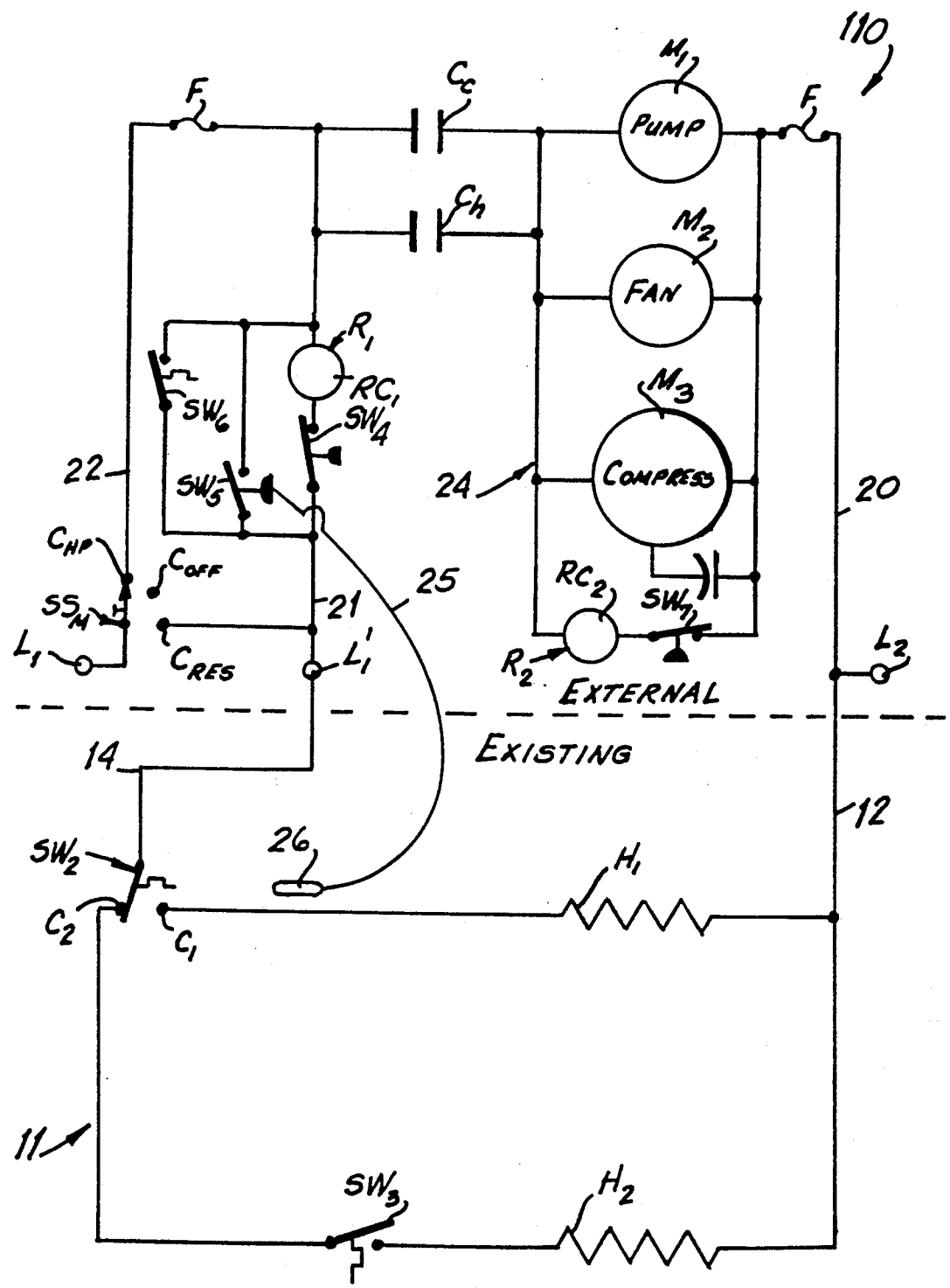

When electric codes allow both the heat pump and the electrical resistance heating elements to operate at the same time, a second embodiment of the invention seen in FIG. 3 can be used. The heat pump water heater control circuit 110 has the same components as the first embodiment 10 with the same reference numbers applied thereto. Additionally, a relay coil $RC_2$ of a holding relay $R_2$ in series with a normally closed temperature or pressure switch $SW_7$ is connected between the wires 20 and 22 in parallel with the heat pump circuit 24 so that closing of contacts $C_c$ serves to energize the relay $R_2$. The holding contacts $C_h$ of the relay $R_2$ are connected in parallel across the contacts $C_c$ so that the contacts maintain the heat pump circuit 24 energized even if the relay $R_1$ is de-energized. Switch $SW_7$ may be a thermostat which senses the temperature of the water circulating through the heat pump or a pressure switch which senses refrigerant condensing pressure in the heat exchanger. When the circulating water temperature or refrigerant condensing pressure reaches a preset level, switch $SW_7$ opens causing relay $R_2$ to be de-energized and contacts $C_h$ to open until the next cycle.

The circuit 110 operates like the circuit 10 up to the time the contacts $C_c$ close. The relay $R_2$ causes the contacts $C_h$ to close so that the heat pump HP continues to operate regardless of the activation state of relay $R_1$. At the same time, the upper heating element $H_1$ has full power applied thereto so that it also heats the water. This configuration gives the very fastest recovery rate of hot water. Once the water temperature at the upper portion of the water tank opens the switch $SW_5$, the circuit 110 causes the system to revert back to heat pump heating only.

What is claimed as invention is:

1. A thermostatic control circuit adapted to control the operation of both existing electrically powered conventional electric resistance upper and lower heating elements in the water tank in an electric hot water heater and a water heating heat pump where the existing resistance heating elements are normally powered through an existing thermostatic switch network having a lower switch responsive to the temperature of the water in the lower portion of the water tank to close in response to the water in the lower portion of the water tank dropping below a lower prescribed threshold value and an upper switch responsive to the temperature of the water in the upper portion of the water tank to shift from a first position to a second position in response to the temperature of the water in the upper portion of the water tank dropping below an upper prescribed threshold value, where the lower heating element is connected to line voltage from an electrical power source through the lower switch and the upper switch in series in response to said lower switch being closed and said upper switch being in said first position, where the upper heating element is connected to line voltage from the electrical power source in response to said upper switch being the second position, and where the lower heating element is disabled in response the upper switch being in the second position so as to produce an electrical power output in response to the temperature of water in the lower portion of the water tank being below the lower prescribed threshold level, said thermostatic control circuit comprising:

an impedance serially connecting said existing resistance heating elements to the electrical power output on said existing thermostatic switch network, said impedance having a sufficiently high impedance to reduce the current flow through said existing resistance heating elements to a level to substantially prevent the operation thereof when said existing thermostatic switch network provides line voltage at the electrical power output;

auxiliary control means operatively associated with said impedance and responsive to line voltage applied to said impedance to connect said water heating heat pump to line voltage to operate same; and bypass switch means in parallel with said impedance for shorting out said impedance, said bypass switch means operable independently of the upper switch in the existing thermostatic switch circuit and responsive only to the temperature of the water at a prescribed upper position in the upper portion of the water tank dropping below a prescribed lower level to disable said heat pump while connecting said heating elements directly to line voltage through the existing thermostatic switch circuit to raise the amount of current flow through said heating elements to a level for at least the upper existing resistance heating element to heat the water and to again open responsive to the temperature of the water at said prescribed upper position in the water tank rising above a prescribed cutoff level to reactivate said heat pump while disabling said heating elements to automatically return the control of said existing resistance heating elements and water heating heat pump back to said impedance and said auxiliary control means as long as the temperature at said prescribed upper position is above said prescribed cutoff level.

2. The circuit of claim 1
wherein said impedance is a relay coil having a resistance such that the current flow through said resistance heating elements is so low that virtually no water is heated by said resistance heating elements;

wherein said control means includes a set of normally open relay switch contacts operatively associated with said relay coil which are closed by said relay coil responsive to said relay coil being energized by closure of said existing thermostatic switch network to connect said operating circuit of said water heating heat pump to line voltage to operate same as long as said existing thermostatic switch network remains closed; and wherein said bypass switch means includes a thermostatic switch connected in parallel with said relay coil to close responsive to the temperature of the water at a prescribed upper position in the water tank dropping below said prescribed lower cutoff level to de-energize said relay coil while connecting said heating elements directly to line voltage to raise the amount of current flow through said heating elements to a level to heat the water and to again open responsive to the temperature of the water at said prescribed upper position in the water tank rising above said prescribed lower cutoff level to re-energize said relay coil while disabling said heating elements.

3. The circuit of claim 2 further including low temperature thermostatic switch means connected in parallel with said relay coil, said low temperature thermostatic switch means adapted to close responsive to the ambient temperature around said water heating heat pump dropping below a prescribed minimum value to effectively electrically short out said relay coil and disable said normally open relay switch contacts while connecting the existing resistance heating elements directly to line voltage through said thermostatic switch network as long as the ambient temperature around said heat pump remains below said prescribed minimum value.

4. The circuit of claim 2 wherein said bypass switch means is a bulb type thermostat including a sensing bulb and a capillary tube connecting said bulb to said switch means, said sensing bulb located in the water tank at said prescribed upper position so that said bypass switch means is responsive to the water temperature at said sensing bulb.

5. The circuit of claim 4 further including a protective coating covering said sensing bulb and capillary tube.

6. The circuit of claim 2 further including a normally closed overload switch connected in series with said relay coil and operatively associated with said heat pump to open in the event of an overload in said heat pump and disconnect said relay coil from line voltage to disable said normally open relay switch contacts and said heat pump.

7. The circuit of claim 2 further including holding relay means operatively connecting said heat pump to line voltage, said holding relay means activated responsive to said bypass switch means being activated to connect said heat pump to line voltage independently of said relay switch contacts.

8. The circuit of claim 2 further including holding relay means operatively connecting said heat pump to line voltage, said holding relay means activated responsive to said relay contacts initially closing to connect said heat pump to line voltage independently of said relay switch contacts.

9. The circuit of claim 8 wherein said holding relay means is operatively connected to deactivating switch means to deactivate said holding relay means upon the occurrence of a predetermined condition in said water heating heat pump.

10. The circuit of claim 9 wherein said deactivating switch means comprises a pressure switch operatively associated with said heat pump to deactivate said holding relay responsive to condensing pressure in said heat pump reaching a preset level.

11. The circuit of claim 9 wherein said deactivating switch means comprises a thermostatic switch operatively associated with the water circulating through said heat pump to deactivate said holding relay responsive to the circulating water temperature reaching a preset level.

12. A method of disabling the electric resistance upper and lower heating elements in the existing tank circuitry of an electric hot water heater where the existing resistance heating elements are normally powered through an existing thermostatic switch network having a lower switch responsive to the temperature of the water in the lower portion of the water tank to close in response to the water in the lower portion of the water tank dropping below a lower prescribed threshold value and an upper switch responsive to the temperature of the water in the upper portion of the water tank to shift from a first position to a second position in response to the temperature of the water in the upper portion of the water tank dropping below an upper prescribed threshold value, where the lower heating element is connected to line voltage from an electrical power source through the lower switch and the upper switch in series in response to said lower switch being closed and said upper switch being in said first position, where the upper heating element is connected to line voltage from the electrical power source in response to said upper switch being the second position, and where the lower heating element is disabled in response the upper switch being the second position so as to produce an electrical power output in response to the temperature of water in the lower portion of the water tank being below the lower prescribed threshold level comprising the steps of:
  (a) disconnecting the line voltage from the thermostatic switch network in the existing tank circuitry;
  (b) reconnecting the thermostatic switch network in the existing tank circuitry to line voltage through an impedance having a sufficiently high impedance value to reduce the current flow through the resistance heating elements to a level to substantially prevent the heating capability of the resistive heating elements responsive to the lower switch in the thermostatic switch network being closed while creating a voltage drop across the impedance above a prescribed threshold value; and
  (c) placing a bypass switch in parallel across the impedance which is responsive to the temperature of the water in at a prescribed upper location in the upper portion of the water tank independently of the upper switch to short out the impedance and allow the resistive heating elements to again operate through the existing thermostatic switch network while the temperature of the water at said upper location is below a prescribed minimum level.

13. The method of claim 12 further comprising the step of:
  connecting the voltage to an electric heat pump heating unit connected to the water heater as long as the voltage drop across the impedance exceeds said prescribed threshold value so that the heat pump heating unit heats the water in the hot water tank.

14. The method of claim 13 further comprising the steps of:
  connecting the voltage to a holding relay through a deactivating switch to activate the holding relay responsive to the voltage drop across the impedance initially exceeding said prescribed threshold value and remain activated until the deactivating switch opens; and connecting the holding relay to the electric heat pump heating unit connected to the water heater to keep the heat pump heating unit operating independently of the voltage drop across the impedance so that the heat pump heating unit continues to heat the water in the hot water tank responsive to the bypass switch means shorting out the impedance.

15. A method of connecting an electric hot water heater equipped with upper and lower resistance heating elements and a thermostatic switch network to line voltage where the existing thermostatic switch network has a lower switch responsive to the temperature of the water in the lower portion of the water tank to close in response to the water in the lower portion of the water tank dropping below a lower prescribed threshold value and an upper switch responsive to the temperature of the water in the upper portion of the water tank to shift from a first position to a second position in response to the temperature of the water in the upper portion of the water tank dropping below an upper prescribed threshold value, where the lower heating element is connected to line voltage from an electrical power source through the lower switch and the upper switch in series in response to said lower switch being closed and said upper switch being in said first position, where the upper heating element is connected to line voltage from the electrical power source in response to the upper switch being the second position, and where the lower heating element is disabled in response the upper switch being the second position so as to produce an electrical power output in response to the temperature of water in the lower portion of the water tank being below the lower prescribed threshold level comprising the steps of:
  (a) connecting the resistance heating elements and thermostatic switch network to line voltage through an impedance having a sufficiently high resistance value to reduce the current flow through the resistance heating elements to a level to substantially prevent the heating capability of the resistance heating elements responsive to the thermostatic switch network being closed while creating a voltage drop across the impedance exceeding a prescribed threshold value;
  (b) connecting line voltage to an electric heat pump heating unit connected to the water heater as long as the voltage drop across the impedance exceeds the prescribed threshold value so that the heat pump heating unit heats the water in the tank of the hot water heater; and
  (c) connecting a bypass switch in parallel across the impedance so that said bypass switch is responsive to the temperature of the water in at a prescribed upper location in the upper portion of the water tank of the water heater independently of the upper switch to short out the impedance and allow the resistive heating elements to again operate while the temperature of the water at said upper location is below a prescribed minimum level.

16. The method of claim 15 further comprising the steps of:
  connecting the voltage to a holding relay through a deactivating switch to activate the holding relay responsive to the voltage drop across the impedance initially exceeding said prescribed threshold value and remain activated until the deactivating switch opens; and connecting the holding relay to the electric heat pump heating unit connected to the water heater to keep the heat pump heating unit operating independently of the voltage drop across the impedance so that the heat pump heating unit continues to heat the water in the hot water tank responsive to the bypass switch means shorting out the impedance.

17. The method of claim 16 wherein the bypass switch has a sensing bulb that controls the operation thereof further comprising the step of:
  locating the sensing bulb at the same level in the water heater as the level controlling the upper heating element and selecting a similar operating temperature for the bypass switch means as selected for the upper heating element so that the bypass switch means is activated at about the same temperature as the upper heating element.

* * * * *